United States Patent [19]
Hirata

[11] Patent Number: 5,933,248
[45] Date of Patent: Aug. 3, 1999

[54] POSITION ADJUSTING APPARATUS FOR IMAGE READER UNIT

[75] Inventor: Manabu Hirata, Okazaki, Japan

[73] Assignee: Minolta Co., Ltd., Osaka, Japan

[21] Appl. No.: 08/947,485

[22] Filed: Oct. 10, 1997

[30] Foreign Application Priority Data

Mar. 11, 1997 [JP] Japan .................................. P9-055674

[51] Int. Cl.$^6$ .................................................. H04N 1/00
[52] U.S. Cl. ............................ 358/406; 358/474; 358/497
[58] Field of Search ..................................... 358/406, 474,
358/497, 482, 483, 513, 514; 200/208.1,
239; 359/822; 348/294, 207, 190; H04N 1/00

[56] References Cited

U.S. PATENT DOCUMENTS

| | | | |
|---|---|---|---|
| 4,318,135 | 3/1982 | Allis et al. | 358/474 |
| 5,075,539 | 12/1991 | Shiraishi | 250/208.1 |
| 5,267,089 | 11/1993 | Yamamoto et al. | 359/822 |

FOREIGN PATENT DOCUMENTS

| | | |
|---|---|---|
| 61-10379 | 4/1986 | Japan . |
| 3-10460 | 1/1991 | Japan . |
| 04349409 | 3/1992 | Japan . |

Primary Examiner—Edward L. Coles
Assistant Examiner—Cheukfan Lee
Attorney, Agent, or Firm—McDermott, Will & Emery

[57] ABSTRACT

A mechanism for facilitating necessary axial adjustments for an image reader unit with a simple arrangement and operation. The image reader unit 2, on which a sensor 4 and a lens 6 are joined to each other in a specific positional relationship along the optical axis L, is so held by a supporting mechanism 41 that the image reader unit 2 can rotate at the lens side about an axis R of rotation which is parallel to the optical axis L and can swing at the sensor side vertically about a pivotal point P which is located on the axis R. A height adjusting mechanism 42 rotatably supports the image reader unit 2 at the sensor side and adjusts its height, and a tilt adjusting mechanism 43 adjusts the inclination of the image reader unit 2 by rotation around the axis R.

11 Claims, 10 Drawing Sheets

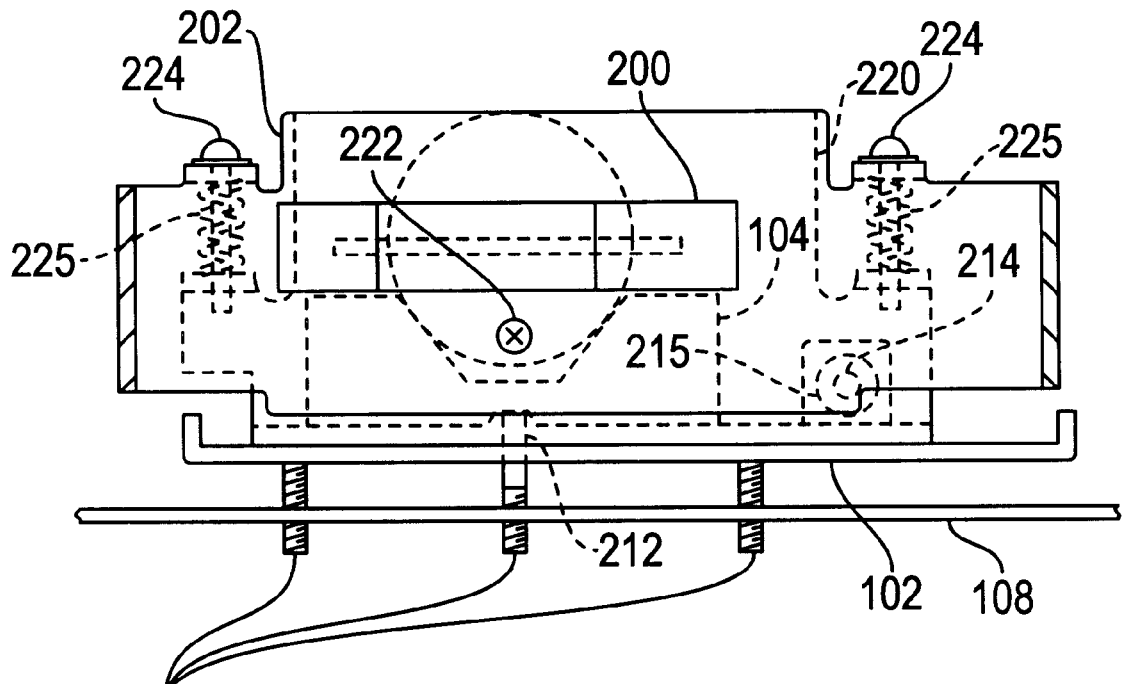
FIG. 13
(PRIOR ART)
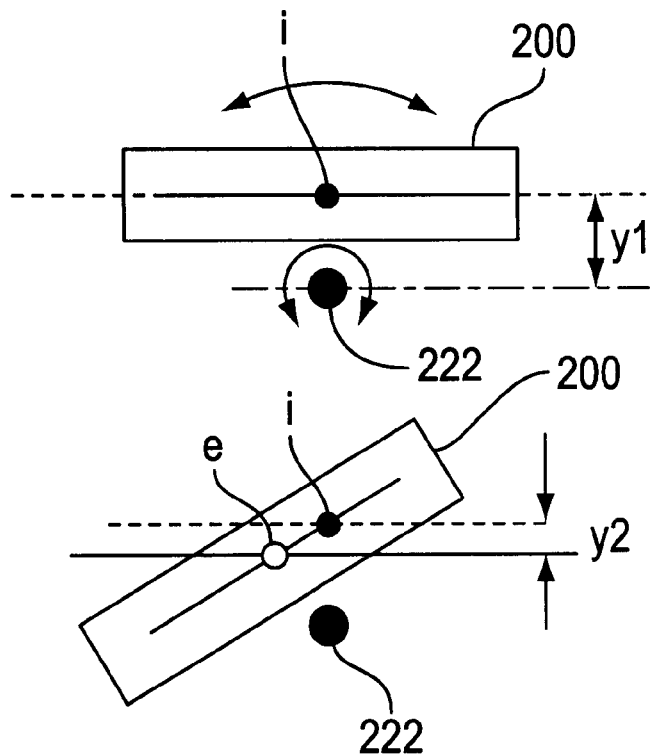
FIG. 14A
(PRIOR ART)
FIG. 14B
(PRIOR ART)

POSITION ADJUSTING APPARATUS FOR IMAGE READER UNIT

BACKGROUND OF THE INVENTION

1. Technical Field of the Invention

The present invention relates to an apparatus for adjusting the position of an image reader unit on which a sensor such as a charge-coupled device (CCD) line sensor for image reading and a lens for projecting an original image on to the sensor are joined to each other in a specific positional relationship along the optical axis.

2. Description of Related Art

For controlling the relative position between a lens and a sensor and their orientations, it is generally necessary to provide five or six axes for adjustment. There have been some image reader units provided with adjusting mechanisms for manually or automatically controlling each axis for adjustment. FIG. 10 shows such six adjusting axes for positioning a lens 100 and a sensor 200.

In FIG. 10, x, y, z1, and z2 respectively represent the lengths of movement along the X, Y, and Z axes. Angles of rotation around the Y and Z axes are denoted respectively by ry and rz. The adjustment along x, y, z1, z2, and around ry and rz is made for the following purposes:

- x: alignment of reading reference between the original document do and the sensor 200;
- y: alignment between focusing point of the lens 100 and pixel location of the sensor 200 for adjustment of reading position;
- z1: adjustment of distance between the lens 100 and the sensor 200 for magnification focusing;
- z2: adjustment of distance between the original document do and the image reader unit IRU on which the lens 100 and the sensor 200 are joined to each other in a specific positional relationship for adjusting major scanning magnification;
- ry: focusing of both center and edge of the original document for correction of defocusing at one end;
- rz1: adjustment of inclination of the sensor 200 with respect to a reference line for skew correction; and
- rz2: adjustment of inclination of the image reader unit IRU with respect to the reference line of the document do for skew correction.

Generally, the maximum reading width of the sensor 200 in the scanning direction is large enough to cover the entire size of the original document placed on a platen glass, thus eliminating the need for positional adjustment along the X axis. For example, if the reduction of the lens 100 is ⅙ and the sensor 200 has 5000 pixels (with the pitch of 7 micrometers), the reading width of the sensor 200 is 315 mm, which is greater than the width 297 mm of a landscape A4 sheet. Accordingly, the adjustment of the sensor 200 along the main scanning direction can be eliminated, thus enabling five-axis adjustment.

FIGS. 11 to 13 illustrate a conventional apparatus for adjustment of five axes. The lens 100 is fixedly mounted at a given position on a mounting platform 102 with a positioning guide 104 and a metal band 106. The sensor 200 is fixedly mounted to a sensor holder 202, which is connected to the mounting platform 102 by an intermediate support 220 so that the adjustment of z1, ry, and rz axes can be made. The mounting platform 102 is coupled to a base 108 of an image reading apparatus for adjustment of y and z2 axes.

More specifically, the adjustment of y is made by height control with a group of screws 230 between the mounting platform 102 and the base 108 shown in FIGS. 12 and 13. The adjustment of rz is accomplished by the relative movements between a sensor holder 202 and the intermediate support 220 about a screw 222 with the control of screws 224 and springs 225 as shown in FIGS. 11 and 12. The adjustment of z1 is made by the relative movements along the optical axis i between the intermediate support 220 and the mounting platform 102 with the control of screws 204 in slots 205 shown in FIG. 12. Similarly, the adjustment of z2 is made by the relative movements along the optical axis i between the mounting platform 102 and the base 108 with the control of screws 206 in slots 207. The adjustment of ry is accomplished by the relative movements about a screw 212 between the intermediate support 220 and the mounting platform 102 with the control of a screw 214 and a spring 215 as shown in FIGS. 11 to 13.

The positioning of the lens 100 and the sensor 200 is determined through movements and rotation according to an output voltage of the sensor 200 released on receipt of image information obtained by reading a test pattern on the original document do.

In the above-described conventional position adjusting mechanism, y is the only axis along which the lens 100 and the sensor 200 are unitedly adjusted. Since the adjustment of z1, z2, ry, and rz is made only for the sensor 200 separately of the lens 100, the lens 100 must initially be mounted with highly accurate positioning with respect to the z1, z2, ry, and rz axes. Also, the adjustment of y using the three screws 230 is troublesome and tends to cause inclination of the surface along the optical axis and the surface vertical thereto.

The sensor 200 is carried by the sensor holder 202 which has a center of rotation around the screw 222 as shown in FIGS. 12 and 13. The adjustment of rz is thus conducted around the screw 222 which is away from the optical axis i, across which the sensor 200 is located, by the distance y1 as best shown in FIG. 14A. When the angle of inclination of the sensor 200 is changed by the adjustment of rz as shown in FIG. 14B, the viewing level e relative to the unvarying optical axis i of the lens 100 is dislocated by the distance y2. In other words, the adjustment of rz affects the length of y, thus requiring readjustment of y after completion of the adjustment of rz.

Moreover, the screw 212 for the adjustment of ry is spaced by the distance z3 toward the lens side from the surface where the sensor 200 is mounted as shown in FIG. 12. Because of this, the adjustment of ry causes changes in image reading position of the sensor 200 along the Z axis. The adjustment of ry thus affects the lengths of z1 and z2, requiring readjustment of z1 and z2 after completion of the adjustment of ry.

Accordingly, the overall adjusting mechanism becomes intricate in construction and requires a considerable amount of operating skill. The adjustment of each axis must be repeatedly conducted so as to complete all of the adjustments of the axes interacting each other, thus increasing the duration of the overall adjusting operation.

BRIEF SUMMARY OF THE INVENTION

It is an object of the present invention to provide a position adjusting apparatus for an image reader unit which enables any axis to be quickly and accurately adjusted with a simple arrangement and operation.

To accomplish the object, an image reader unit incorporated in an image reading apparatus according to the present invention, for which a position adjusting apparatus of the present invention is intended for use, comprises a sensor for reading an image and a lens for projecting the image of an original document onto said sensor, the sensor and the lens both being positioned along an optical axis with respect to each other and carried on an identical supporting member. The position adjusting apparatus for the image reader unit according to the present invention comprises a supporting mechanism which supports the image reader unit at a side of the lens while allowing the image reader unit to rotate around an axis of rotation which is parallel to the optical axis of the image reader unit, and provides a central point of swing on the axis of rotation, about which the image reader unit can swing at a side of the sensor in a direction vertical to the axis of rotation, a height adjusting mechanism which supports the image reader unit and adjusts the height thereof at the sensor side while allowing the image reader unit to rotate around the axis of rotation, and a tilt adjusting mechanism for adjusting an inclination of the image reader unit by rotation thereof around the axis of rotation.

As the lens and the sensor on the image reader unit are adjusted and joined to each other in the predetermined positional relationship along the optical axis, they serve as an independent component assembly accurately positioned on a single support member and can be manufactured in a specific assembly step thus reducing the cost of production. Also, the y-axis adjustment of the image reader unit can be made with the height adjusting mechanism at the sensor side without affecting the relative positional relationship between the lens and the sensor, since the supporting mechanism provides the height adjusting mechanism with a central point of swing to allow the sensor side of the image reader unit to vertically swing thereabout. Accordingly, the same effect as of the conventional adjustment of reading position by changing the height of the lens will be gained. The image reader unit can be rotated about the axis which extends in parallel with the optical axis by the support and the height adjusting mechanism at any height determined by the height adjusting mechanism. This allows the skew correction of the image reader unit to be performed by carrying out the adjustment of rz or adjusting the inclination of the image reader unit with the tilt adjusting mechanism located at the sensor side without affecting the accurate positional relationship between the lens and sensor and the height adjustment which has been done by the height adjusting mechanism. As a result, the skew correction of rz and the adjustment of y for the image reading position can be made readily without necessitating any readjustment.

Other and further objects, features and advantages of the invention will appear more fully from the following description in conjunction with the accompanying drawings.

BRIEF DESCRIPTION OF THE DRAWINGS

FIG. 13 is a back view thereof partly omitted; and

FIGS. 14A and 14B are explanatory views showing skew correction of the sensor in the image reader unit of FIG. 11.

DETAILED DESCRIPTION OF PREFERRED EMBODIMENTS

Preferred embodiments of the present invention will be hereinafter described referring to the accompanying drawings.

<First Embodiment>

Figure 2:
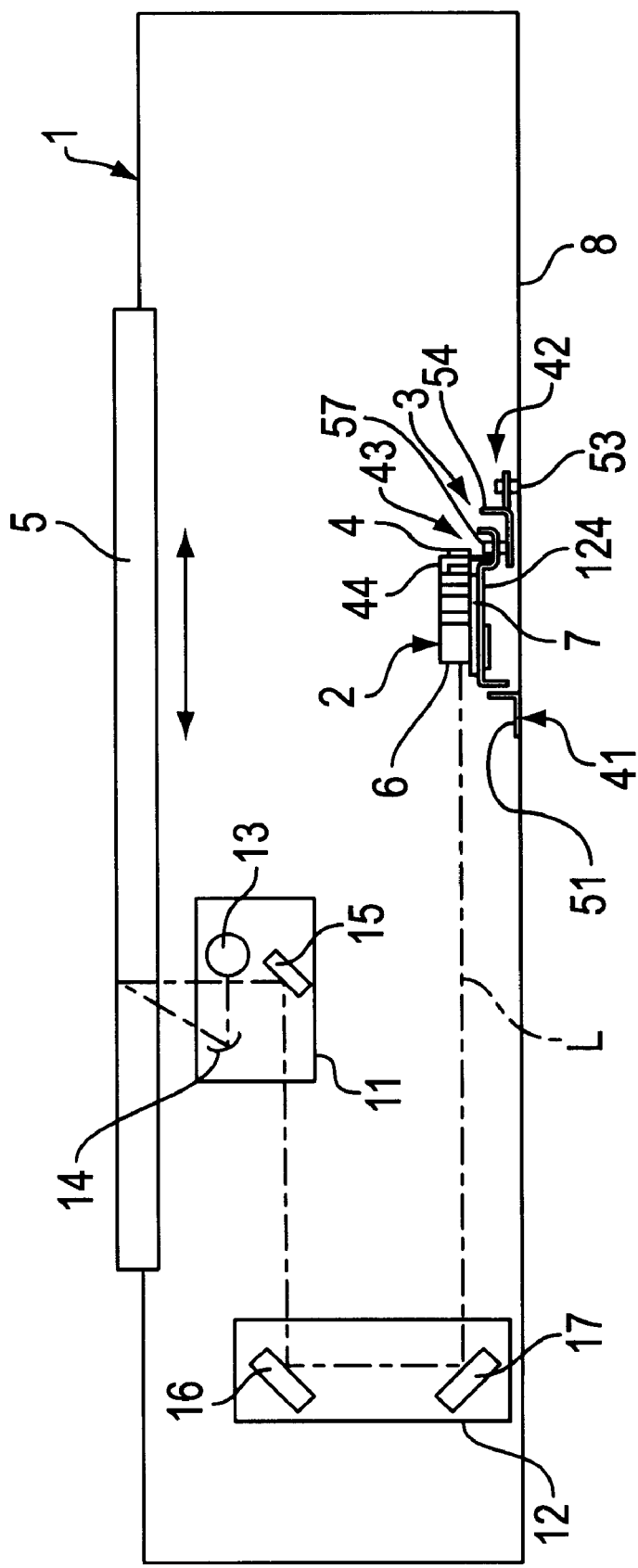
FIG. 2 is a schematic view of an image reading apparatus in which the image reader unit is installed according to the arrangement of FIG. 1.

Referring to FIG. 2, a first embodiment of the present invention is implemented as a position adjusting apparatus 3 for mounting an image reader unit 2 in an image reading apparatus 1 or the like. The image reader unit 2 comprises a CCD line sensor 4 for reading an image and a lens 6 for projecting the image of an original document, which may be manually placed on a platen glass 5, onto the CCD line sensor 4. The CCD line sensor 4 and the lens 6 are accurately positioned with respect to each other on a mounting platform 7. Various mounting mechanisms may be employed for the positioning of the sensor 4 and the lens 6. In this embodiment, the lens 6 and the CCD line sensor 4 are united on the mounting platform 7 with a sensor mounting base plate 44 with their positions along the optical axis L adjusted with respect to each other. The image reader unit of such configuration can be independently produced at low cost in a specific assembling process or operation, being accurately placed and connected on the single mounting platform 7. Sensor for reading an image is not limited to the CCD line sensor but may be replaced with other types of charge-coupled devices having similar functions.

The image reader unit 2 is securely mounted at a given location in a main body 8 of the image reading apparatus 1 for scanning an original document placed on the platen glass 5 with a first moving member 11 running forward and backward along a direction denoted by the arrow. A reflected light from the document at each scanning position is directed by a second moving member 12 to the lens 6 and projected on to the CCD line sensor 4.

Formation of the image on the CCD line sensor 4 is determined by the distance along the optical axis L between the CCD line sensor 4 and the lens 6 and the distance between the document and the image reader unit 2. Since the CCD line sensor 4 and the lens 6 are accurately positioned to each other as described, it is only necessary to control the distance between the document and the image reader unit 2. This can be achieved by a simple positional adjustment in the main body 8 separately of the other mechanisms.

The first moving member 11 is driven for forward and backward movements in parallel with the platen glass 5 by a drive force with a motor, reduction gears, pulleys, and wires (not shown). The first moving member 11 includes a lamp 13, a reflector 14, and a first mirror 15 arranged for illuminating the original document placed on the platen glass 5 from below and directing a reflected light to the second moving member 12. The second moving member 12 is joined to the first moving member 11 by a power transmitting means which includes wires and a timing belt (not shown), and travels with its movable pulleys at a speed half as fast as that of the first moving member 11 in the same direction. The second moving member 12 includes a second mirror 16 and a third mirror 17. The reflected light from the first mirror 15 is inverted 180-degree via the second mirror 16 and the third mirror 17. The first and the second moving members 11, 12 are spaced from each other by a predetermined distance in initial setting and moved together by the driving and power transmitting mechanism while maintaining the length of the optical path between the document and the lens 6 unchanged.

Figure 1:
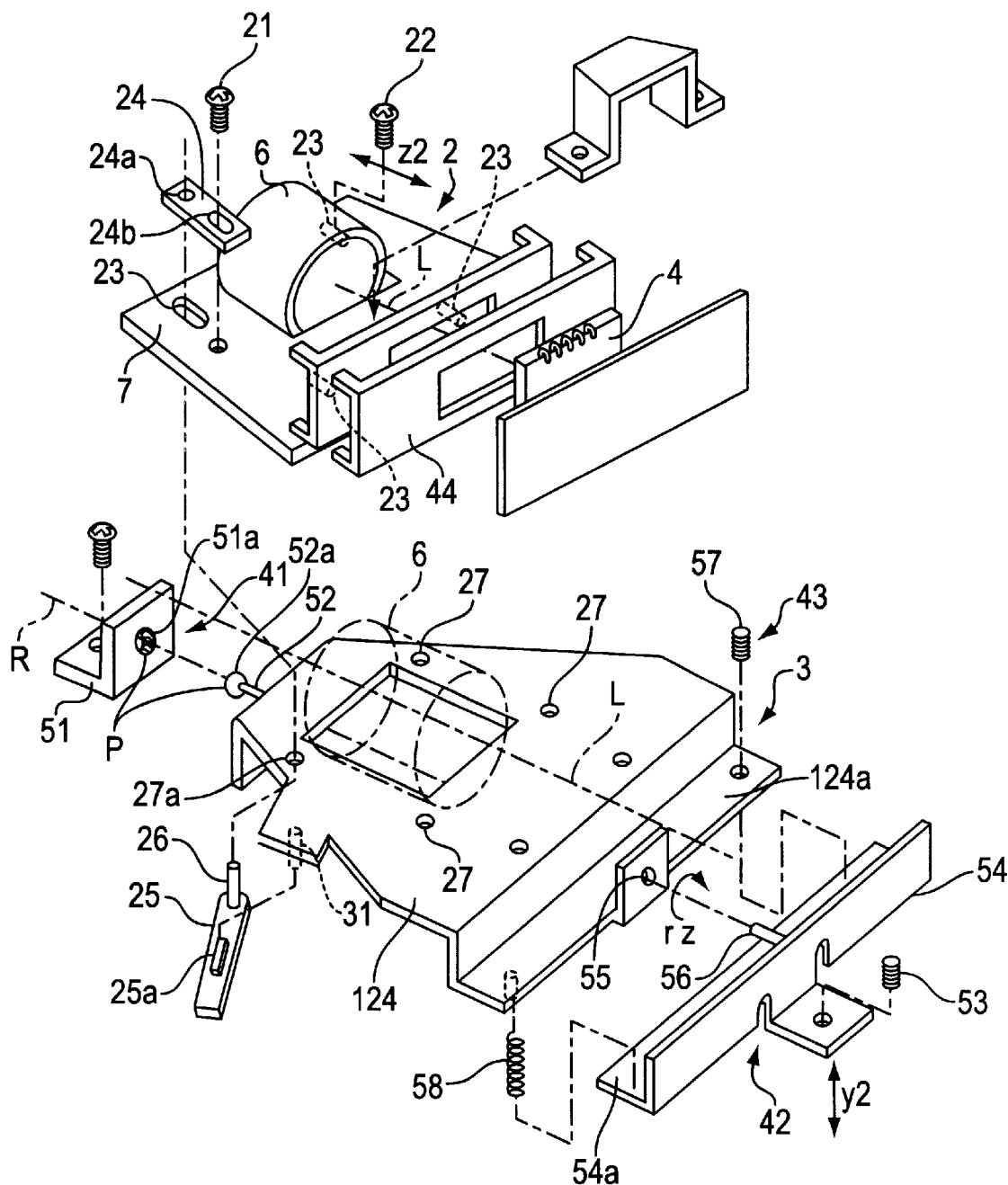
FIG. 1 is an exploded perspective view of an arrangement for mounting an image reader unit according to a first embodiment of the present invention.

The reflected light from the third mirror 17 is guided in a 180-degree opposite direction in parallel to the optical path from the first moving member 11 to the second mirror 16 and led to the lens 6 and the CCD line sensor 4. In FIGS. 1 and 2, the light incident on the lens 6 is focused on the CCD line sensor 4 spaced precisely by a predetermined distance from the lens 6.

The image reader unit 2 is mounted to a given location in the main body 8 by accurate positioning with the position adjusting apparatus 3 of the present invention. The position is determined by processing data with an image data processor (not shown) based on a voltage output of the CCD line sensor 4 outputted on receipt of a reflected light when a given test pattern placed on the platen glass 5 is illuminated by the first moving member 11. Skew correction of the CCD line sensor 4 is conducted and the major scanning magnification is adjusted in order to correct any inclination of the sensor 4 with respect to the image and to correct the magnification.

The adjustment of the major scanning magnification can be fulfilled without affecting the precise positional relation between the CCD line sensor 4 and the lens 6, by locating the mounting platform 7 of the image reader unit 2, along the optical axis L on a base plate 124 installed in the main body 8 with the use of the screws 22 and the slots 23 as shown in FIG. 2. In particular, the apparatus of this embodiment employs an adjusting strip 24 shown in FIG. 1 in order to stably and securely keep the positional state. The adjusting strip 24 is provided with a screw 21 for positioning along the optical axis L on the mounting platform 7 through its slot 24b. The adjusting strip 24 also has a locator aperture 24a provided therein which corresponds to one of the slots 23 provided in the mounting platform 7.

After the distance and skew adjustment between the CCD line sensor 4 and the lens 6 is completed and the major scanning magnification is determined, the adjusting strip 24 is located along the optical axis L by the screw 21 so that its locator aperture 24a coincides across the slot 23 with a matching aperture 27a provided in the base plate 124. Then, when a positioning pin 26 is fitted into the locator aperture 24a and the matching aperture 27a across the slot 23, the image reader unit 2 on the mounting platform 7 is so positioned in both a direction of the optical axis L and a vertical direction thereto on the base plate 124 that its major scanning magnification is adjusted to a desired rate. However, this is established with respect to the positioning pin 26 while the mounting platform 7 and the base plate 124 are left movable about the positioning pin 26 with respect to each other. Thus, the positioning pin 26 is linked to an auxiliary adjusting strip 25 which has a slot 25a for accepting a positioning pin 31 mounted to the base plate 124. This allows the movement about the positioning pin 26 of the mounting platform 7 or the image reader unit 2 with respect to the base plate 124 to be controlled. As the image reader unit 2 is locked at the position on the base plate 124, its optical axis L is aligned with the optical axis of an optical scanning system comprised of the first moving member 11 and the second moving member 12.

Accordingly, the image reader unit 2 carrying the CCD line sensor 4 and the lens 6 precisely positioned to each other can accurately be located on the base plate 124 at such a position that a desired rate of the major scanning magnification is obtained. Its accurate relative position is secured with the screws 22 tightening across the slots 23 into the apertures 27 provided in the base plate 124.

While the adjustment of the x, y, ry, z1, and rz1 axes may be either automatically or manually made, the apparatus of this embodiment is intended to facilitate accurate adjustment of the y2, z2, and rz axes.

For that purpose, the base plate 124 in this embodiment is supported to allow for the adjustment of y2, z2, and rz. As shown in FIG. 1, a supporting mechanism 41 is provided for supporting the image reader unit 2 at the lens side in such a way that the image reader unit 2 can rotate around an axis R which is parallel to the optical axis L, as well as swing vertically about a pivotal point P which is located on the axis R. Also provided are a height adjusting mechanism 42 for adjustment of the height of the image reader unit 2 which rotatably supports the image reader unit 2 at the sensor side around the axis R, and a tilt adjusting mechanism 43 for adjusting inclination of the image reader unit 2 which is mounted on the height adjusting mechanism 42 by rotation around the axis R.

The supporting mechanism 41 comprises a bearing bracket 51 of an L-shaped metal support mounted to a given location in the main body 8. The bearing bracket 51 has a spherical bearing hole 51a provided therein for accepting a ball 52a mounted to one end of a rotating shaft 52 which is projected along the axis R from one end of the base plate 124 at the lens side, on which the image reader unit 2 is mounted. This keeps the image reader unit 2 in position on the mounting platform 7 and the base plate 124, while being able to rotate around the axis R and swing in all directions about the pivotal point P. The arrangement for the supporting mechanism is not limited to the one described above, and the spherical bearing hole 51a may be disposed to the base plate 124 while the rotating shaft 52 is mounted to the bearing bracket 51. Also, the swing motion of the image reader unit 2 about the pivotal point P may be only in vertical directions. The bearing or support may be implemented in various other manners.

The height adjusting mechanism 42 comprises a support bracket 54 of an L-shaped metal support which can be adjusted in height by a screw 53 at a given location in the main body 8. A support shaft 56 is projected from the support bracket 54, which is fitted into an aperture 55 provided in the base plate 124 across the axis R. The height adjusting mechanism 42 thus supports the image reader unit 2 at the sensor side so that the unit 2 can rotate about the axis R, while the support bracket 54 and the screw 53 for height adjustment allows the unit 2 to swing vertically. The arrangement for the height adjusting mechanism is not limited to the one described above, and the support shaft 56 may be mounted to the base plate 124 while the aperture 55 may be provided in the support bracket 54. The support bracket 54 may variously constructed as long as its vertical position is adjustable, employing various other bearing and supporting means.

The tilt adjusting mechanism 43 comprises a coupling portion 124a of the base plate 124 opposite to a flange 54a of the support bracket 54, a screw 57 bolted at one end of the coupling portion 124*a* to the flange 54*a* for determining the distance therebetween, and a spring 58 mounted at the other end of the coupling portion 124*a* for keeping the screw 57 to be contacted with the flange 54*a*. By adjusting the amount of projection of the screw 57 from the coupling portion 124*a* to the flange 54*a*, the inclination of the image reader unit 2 rotated about the axis R can be adjusted on the height adjusting mechanism 42. The arrangement for the tilt adjusting mechanism is not limited to the one described above, and the screw 57 may disposed on the flange 54*a*. Various other arrangements may be employed as long as the inclination of the image reader unit 2 is adjustable on the height adjusting mechanism 42.

The positioning of the image reader unit 2, which is carried on the base plate 124 mounted at the given location of the main body 8, in relation to a test pattern placed on the platen glass 5 will now be explained referring to FIG. 1.

As described previously, the CCD line sensor 4 and the lens 6 on the mounting platform 7 have been accurately aligned to each other along the optical axis L separately of the other components in a specific assembly step and serve as an independent image reader unit 2.

At first, while the test pattern on the platen glass 5 is being illuminated with the first moving member 11, the image reader unit 2 is vertically swung about the pivotal point P at the sensor side by the height adjusting mechanism 42 to set to a level where an output data is obtained. The CCD line sensor 4 of the image reader unit 2 can be thus adjusted along the Y axis just as in the conventional arrangement in which the front side of the lens is adjusted in height to be aligned with a document reading position. The CCD line sensor 4 and the lens 6 on the image reader unit 2 remain in their relative positions accurately determined, and the image reader unit 2 on the mounting platform 7 is held tightly on the height adjusting mechanism 42 by the screw 57 and the spring 58 of the tilt adjusting mechanism 43. Accordingly, the height adjustment can be carried out separately without affecting positions of other components.

Figure 3A:
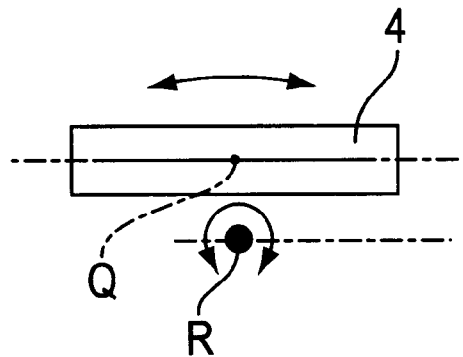
FIG. 3A and 3B are explanatory views showing skew correction of a CCD line sensor in the image reader unit of FIG. 1.
Figure 3B:
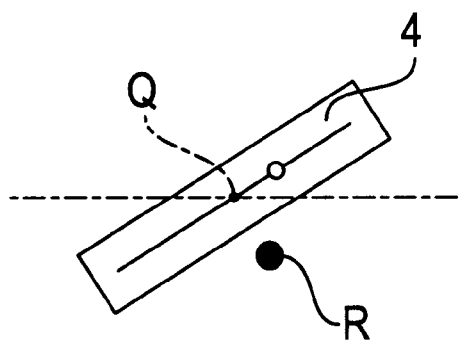

Next, the inclination of the image reader unit 2 is adjusted by the adjustment of projecting amount of the screw 57 on the height adjusting mechanism 42, as the supporting mechanism 41 at the lens 6 side and the height adjusting mechanism 42 at the CCD line sensor 4 side rotatably support the image reader unit 2 around the axis R, in order to obtain stable output of the CCD line sensor 4 on a given scanning line. The adjustment of rz for the image reader unit 2 is, for example, made as shown in FIGS. 3A and 3B for skew correction. The CCD line sensor 4 and the lens 6 in the image reader unit 2 remain in their accurate positional relationship, thus causing their viewing points Q to align with each other as shown in both FIGS. 3A and 3B. Also, as the image reader unit 2 is constantly held at the predetermined level at its CCD line sensor 4 side by the height adjusting mechanism 42, the inclination can be controlled without affecting positions of other components.

Accordingly, both the skew correction by the adjustment of rz and the positioning of the CCD line sensor 4 for precise reading along the Y axis can be carried out quickly and readily without necessitating readjustment of the relevant axial settings including the relative positioning between the CCD line sensor 4 and the lens 6. Also, since the tilt adjustment is carried out on the height adjusting mechanism 42, any of the two positional adjustments which has been made in advance will not be affected by the other adjustment which follows.

The pivotal point P in this embodiment allows the image reader unit 2 at the sensor side to swing in all directions, hence enabling the adjustment along the X axis. The adjustment along x may be implemented by providing an X-axis adjusting mechanism which is movable together with the height adjusting mechanism 42 and the tilt adjusting mechanism 43. Alternatively, the tilt adjusting mechanism 43 may be mounted on the X-axis adjusting mechanism in such a way that the height adjustment can be made together with the X-axis adjusting mechanism and the tilt adjusting mechanism 43.

<Second Embodiment>

Figure 4:
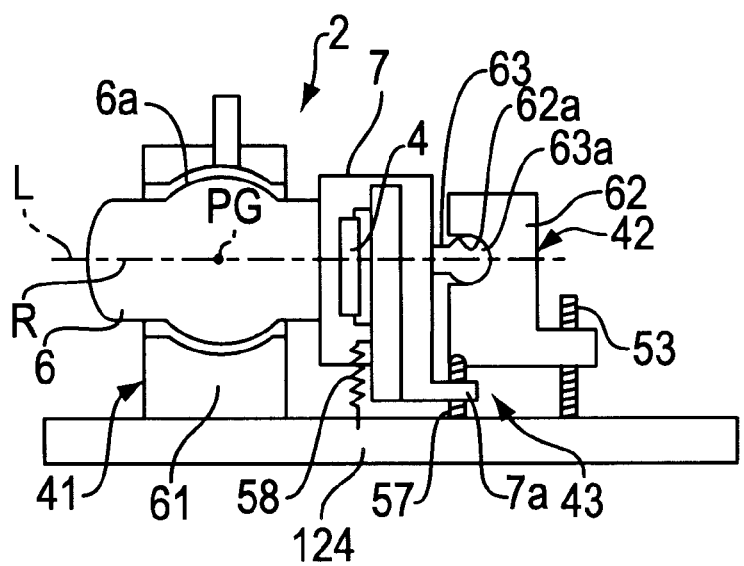
FIG. 4 is a side view of an arrangement for mounting an image reader unit according to a second embodiment of the present invention.
Figure 5:
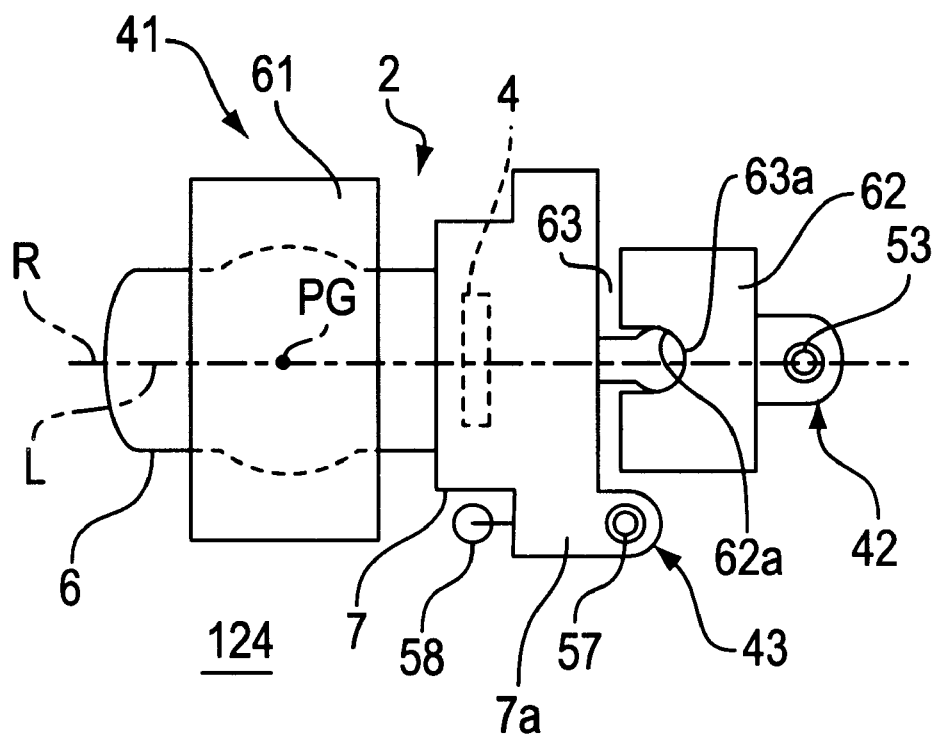
FIG. 5 is a plan view thereof.

FIGS. 4 to 6 show a second embodiment of the present invention. As shown, the CCD line sensor 4 and the lens 6 are precisely positioned with respect to each other on the mounting platform 7 in an arrangement different from that of the first embodiment to construct an image reader unit 2. The supporting mechanism 41 of this embodiment for supporting the image reader unit 2 at its lens side comprises a spherical periphery 6*a* of the lens 6 and a spherical bearing 61 in the main body 8 which receives the spherical periphery 6*a*, so that the image reader unit 2 can rotate about the axis R which is aligned with the optical axis L and its CCD line sensor 4 side can swing in all directions about the pivotal point P.

The height adjusting mechanism 42 includes a support block 62 which is controlled with a screw 53 for height adjustment in the main body 8. The support block 62 has a spherical bearing hole 62*a* therein for accepting a ball 63*a* mounted to one end of a shaft 63 which is extended along the optical axis L and the axis R of the CCD line sensor 4 of the image reader unit 2. If desired, the image reader unit 2 at its sensor side can be adjusted for crosswise positioning about the pivotal point P via the spherical bearing 61 by rotating the height adjusting mechanism 42 about the screw 53.

The tilt adjusting mechanism 43 comprises a screw 57 bolted in a projected portion 7*a* of the mounting platform 7 located in an eccentric position at the CCD line sensor 4 side, and a spring 58 mounted between the mounting platform 7 in the eccentric position and the base plate 124 for keeping the screw 57 in contact with the base plate 124. This allows the mounting platform 7 and the image reader unit 2 mounted on it to be inclined for adjustment about the optical axis L and the axis R.

Since the supporting mechanism 41, the height adjusting mechanism 42, and the tilt adjusting mechanism 43 of the second embodiment have substantially the same effects as those of the first embodiment, like elements are given like reference numerals and the description thereof will be omitted.

Figures 6A, 6B:
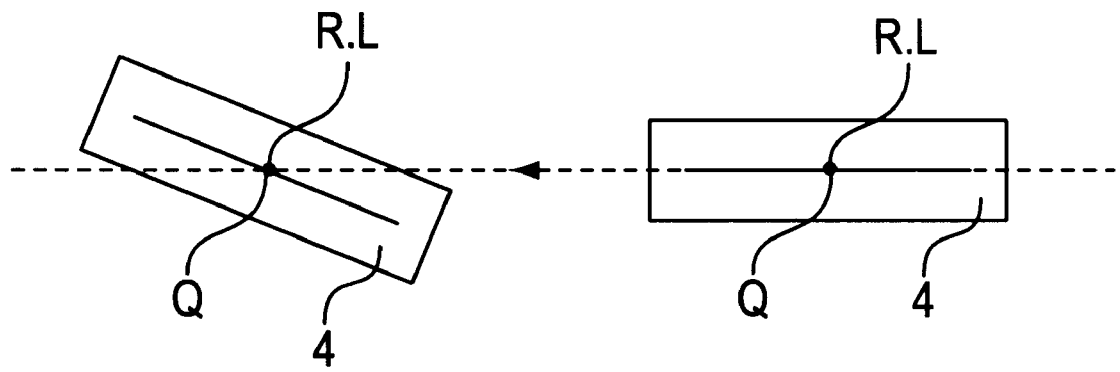
FIGS. 6A and 6B are explanatory views showing skew correction of a CCD line sensor in the image reader unit of FIG. 5.

In this embodiment of the present invention, the axis R of the image reader unit 2 is identical to the optical axis L. Thus, when the adjustment of rz is made about the axis R, the viewing point Q of the CCD line sensor 4 remains aligned with that of the lens 6 as shown in FIGS. 6A and 6B. Even if the optical axis L of the lens 6 is dislocated in the rotation about the axis R, the viewing point Q is not laterally moved from the viewing point Q.

Also, the pivotal point P coincides with the center G of the lens 6. This allows the tilt adjustment of the image reader unit 2 and the vertical or height adjustment of its CCD line sensor 4 side to be conducted with the lens 6 rotating and swinging about its center G, thus eliminating upward or downward dislocation of the lens 6.

Both the height adjusting mechanism 42 and the tilt adjusting mechanism 43 in this embodiment are carried on the base plate 124. If the tilt adjustment with the tilt adjusting mechanism 43 has been made in advance, it will be affected by the following height adjustment of the height adjusting mechanism 42. It is thus essential to carry out the height adjustment prior to the tilt adjustment.

<Third Embodiment>

Figure 7:
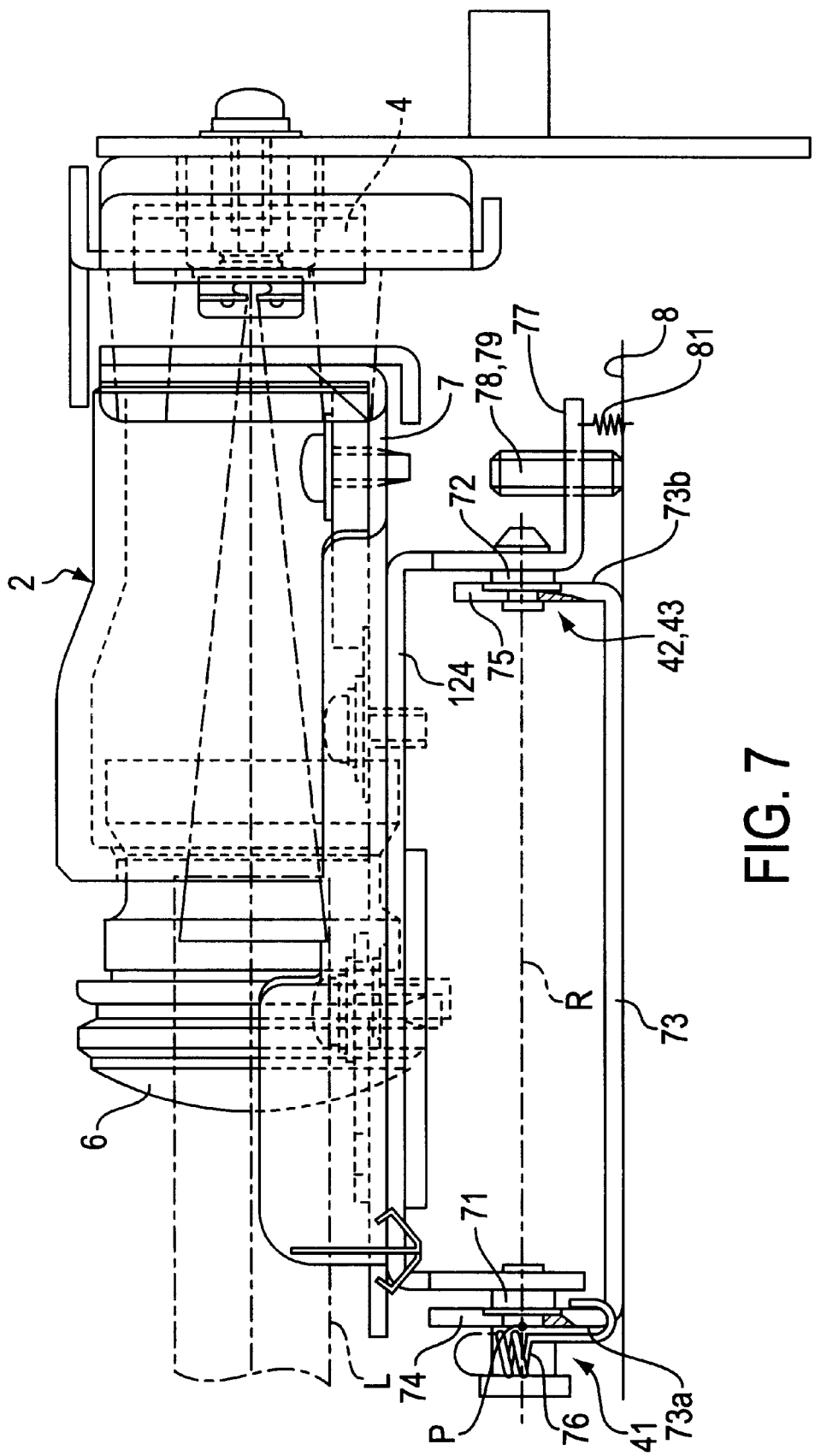
FIG. 7 is a side view of an arrangement for mounting an image reader unit according to a third embodiment of the present invention.
Figure 8:
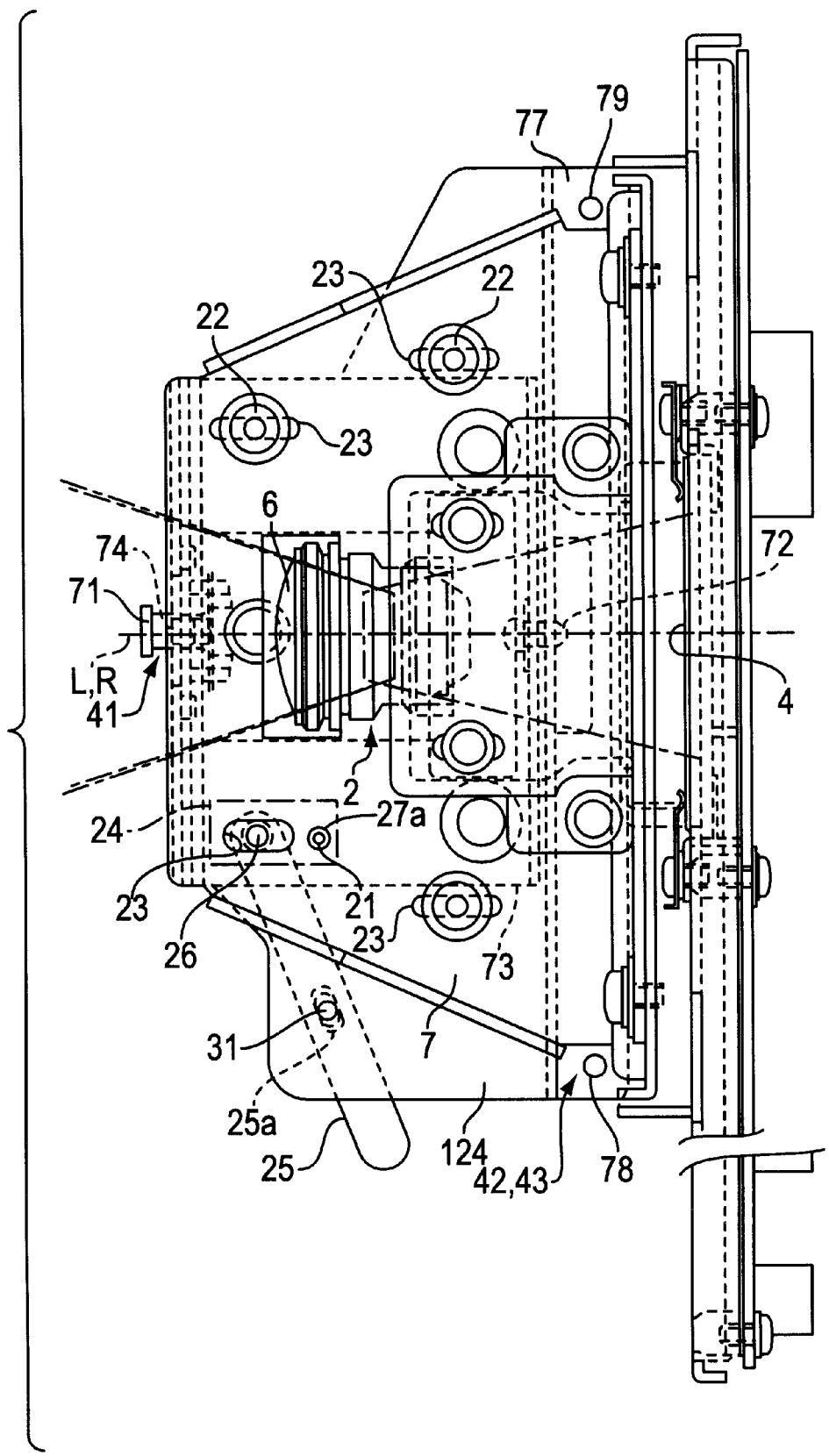
FIG. 8 is a plan view thereof.
Figure 10:
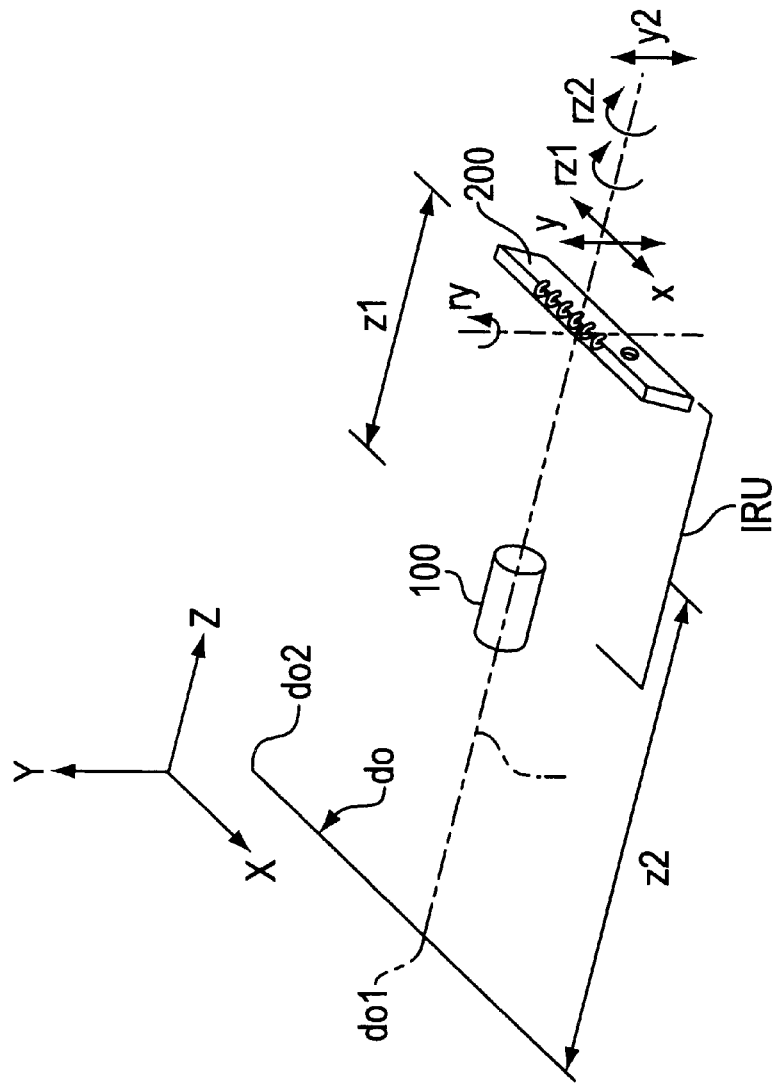
FIG. 10 is an explanatory view showing necessary axes commonly used for adjustment of a lens and a sensor.
Figure 9:
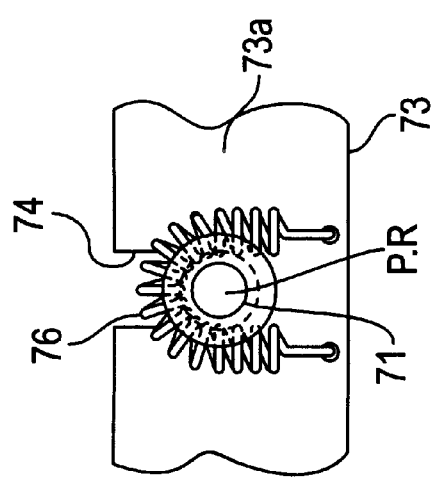
FIG. 9 is a fragmentary front view thereof.
Figure 11:
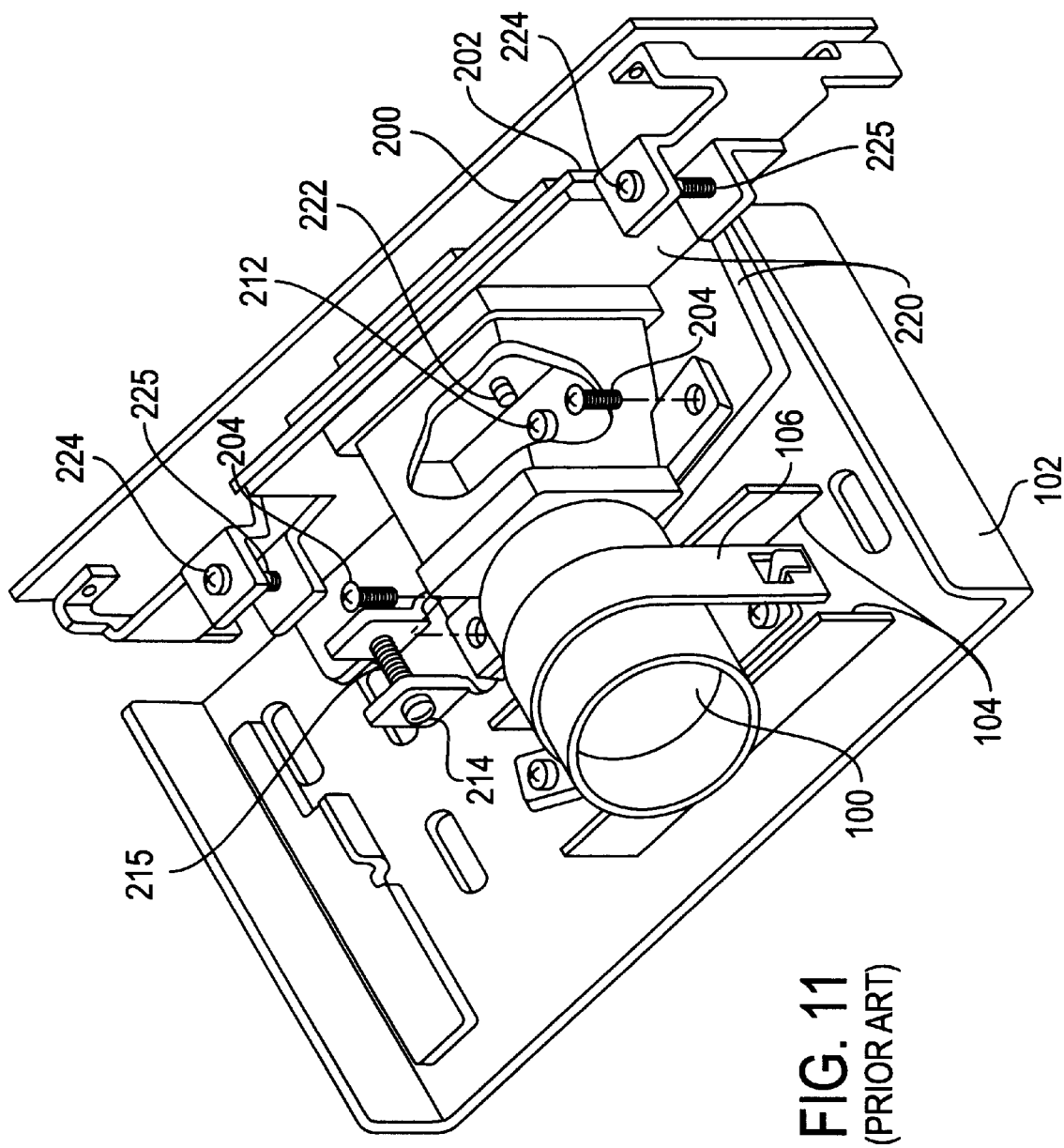
FIG. 11 is a perspective view showing a conventional mounting and adjusting arrangement for the lens and the sensor.
Figure 12:
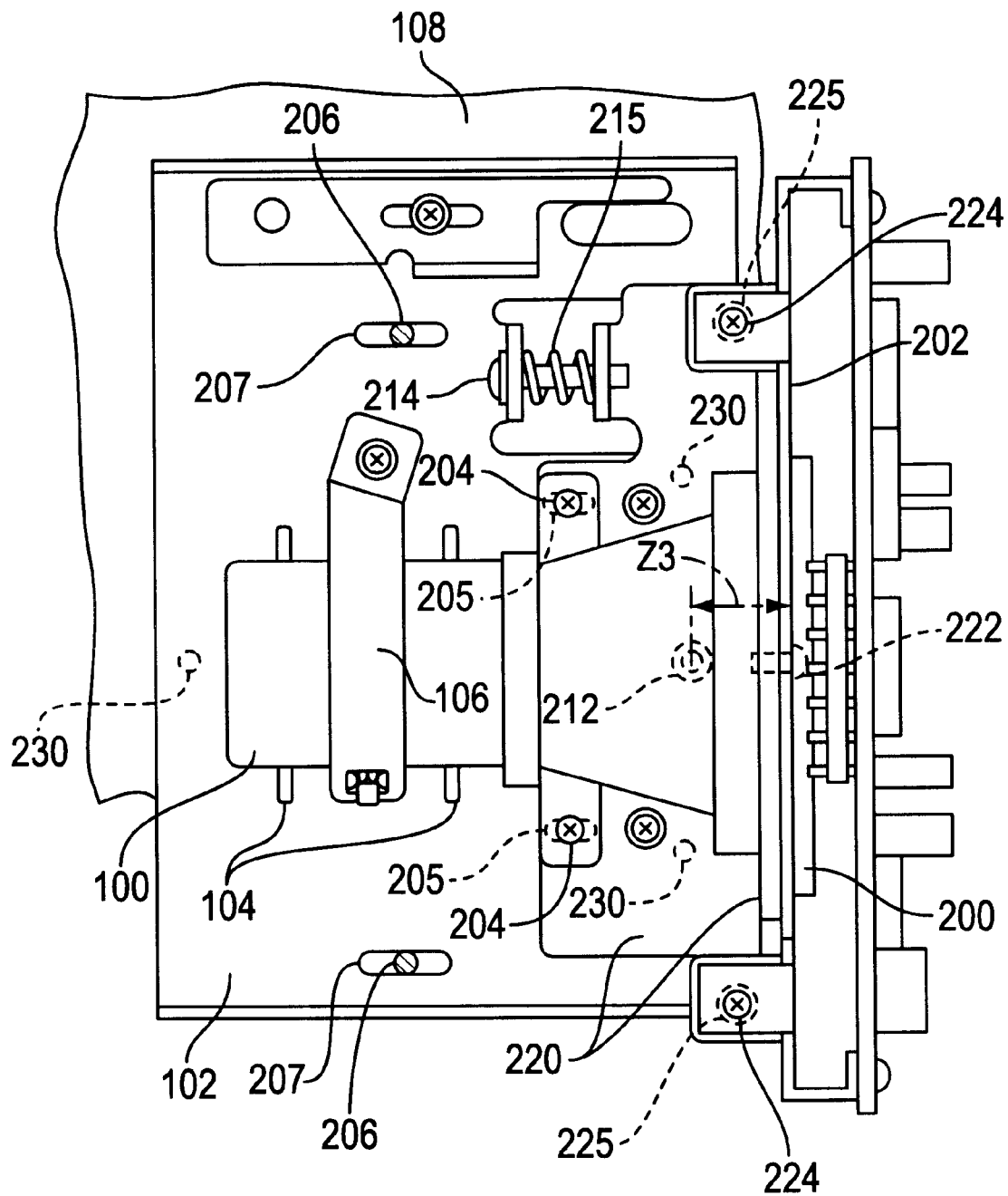
FIG. 12 is a plan view thereof.

A third embodiment of the present invention is a modification of the second embodiment, which is illustrated in FIGS. 7–9. As shown, the image reader unit 2 having the CCD line sensor 4 and the lens 6 mounted at precise positions on the mounting platform 7 is positioned by the positioning pin 26 and the auxiliary adjusting strip 25 disposed between the mounting platform 7 and the base plate 124. The base plate 124 is supported by a pair of shafts 71 and 72 which are mounted at the lens 6 side and the CCD line sensor 4 side respectively, both extending along the axis R in parallel with the optical axis L of the image reader unit 2. The shafts 71 and 72 are respectively fitted into U-shaped bearing notches 74 and 75 at either side in upright wall portions 73a and 73b of a mounting base 73 mounted at a given location in the main body 8 so that the base plate 124 can rotate about the axis R.

As shown in FIGS. 7 and 9, the supporting mechanism 41 in this embodiment comprises a spring 76 by which the shaft 71 is downwardly urged to stay in the lowermost of the bearing notch 74 for allowing the image reader unit 2 to rotate about the axis R and to swing around the pivotal point P at its sensor side, with the shaft 72 guided by the bearing notch 75. To prevent the pivotal point P from moving about when the image reader unit 2 is being swung at its sensor side, it is preferred to form the lowermost of the bearing notch 74 to be a sharp or curved configuration so that the shaft 71 comes substantially in point contact with the lowermost of the bearing notch 74 in a direction across the axis R.

The height adjusting mechanism 42 and the tilt adjusting mechanism 43 at the side of the bearing notch 75 for the image reader unit 2 may be arranged identical to those of the first embodiment. In this embodiment, however, both the height adjusting mechanism and the tilt adjusting mechanism 43 are constructed by a couple of screws 78 and 79 and springs 81, instead. The screws 78 and 79 are bolted at either side of a flange 77 of the base plate 124, which are kept in contact with the main body 8 by the screws 78 provided between the flange 77 and the main body 8. The height and inclination of the image reader unit 2 at its sensor side can be both determined by adjusting the amount of downward projection of the screws 78 and 79 from the flange 77 and a difference between their respective projected lengths. The height adjusting mechanism 42 and the tilt adjusting mechanism 43 in this embodiment are thus comprised of the shaft 72, the bearing notch 75, the screws 78 and 79, and the springs 81. Both the height adjustment and the tilt adjustment can thus be made by controlling the downwardly projected lengths of the screws 78 and 79. It is also possible to perform the height adjustment by the height adjusting mechanism 42 and the tilt adjustment by the tilt adjusting mechanism 43 separately by providing a height controlling means for turning the two screws 78 and 79 in the same direction for height adjustment and a tilt controlling means for turning the two screws 78 and 79 in opposite directions for tilt adjustment. The two adjusting controls can thus be conducted one after the other without affecting the former adjustment.

Other arrangements and effects are similar to those of the first embodiment and will be explained in no more detail.

As set forth above, the position adjusting apparatus for an image reader unit having a lens and a sensor joined to each other in a specific positional relationship according to the present invention permits the skew correction by the adjustment of rz and the adjustment of image reading position by the adjustment of the sensor along the Y axis to be carried out readily without necessitating readjustment of the initial settings including the positional relation between the lens and the sensor of the image reader unit.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reader unit incorporated in an image reading apparatus, comprising:

a sensor for reading an image; and a lens for projecting the image of an original document onto said sensor, the sensor and the lens both being positioned along an optical axis with respect to each other and carried on an identical supporting member, and a position adjusting apparatus for the image reader unit, comprising:

a supporting mechanism which supports the image reader unit at a side of the lens while allowing the image reader unit to rotate around an axis of rotation R which is parallel to the optical axis of the image reader unit, and provides a central point of swing on the axis of rotation, about which the image reader unit can swing at a side of the sensor in a direction vertical to the axis of rotation;

a height adjusting mechanism which supports the image reader unit and adjusts the height thereof at the sensor side while allowing the image reader unit to rotate around the axis of rotation; and a tilt adjusting mechanism 43 for adjusting an inclination of the image reader unit by rotation thereof around the axis of rotation.

2. A position adjusting apparatus for the image reader unit according to claim 1, wherein said supporting mechanism is comprised of a metal bearing fixed at a predetermined position in a main body of the image reading apparatus, a spherical bearing hole provided in the metal bearing, and a rotating shaft projected from a body of the position adjusting apparatus and provided with a ball member at one end thereof to be received by the spherical bearing hole in the metal bearing.

3. A position adjusting apparatus for the image reader unit according to claim 1, wherein the axis of rotation of said supporting mechanism coincides substantially with the optical axis.

4. An image reader unit incorporated in an image reading apparatus, comprising:

a sensor for reading an image;

a lens for projecting the image of an original document onto said sensor, and a supporting member for supporting the sensor and the lens, both being positioned with respect to each other along an optical axis, and a position adjusting apparatus for the image reader unit, comprising:

a supporting mechanism which supports a spherical periphery of the lens with a ball bearing while allowing the image reader unit to rotate around an axis of rotation which coincides with the optical axis and to swing at a side of the sensor in all radial directions about a central point of swing;

a height adjusting mechanism for supporting the image reader unit at the sensor side in such a way that the image reader unit can rotate around the optical axis or the axis of rotation and for adjusting the height of the image reader unit at the same side; and a tilt adjusting mechanism for adjusting an inclination of the image reader unit by rotation thereof around the optical axis or the axis of rotation.

5. A position adjusting apparatus for the image reader unit according to claim 4, wherein said height adjusting mechanism is comprised of a support block disposed in a main body of the image reading apparatus and a screw for adjusting the height of the support block.

6. The height adjusting mechanism according to claim 5, herein the support block is comprised of a spherical bearing hole for receiving a ball member at one end of a rotating shaft provided at the sensor side of the image reader unit.

7. A position adjusting apparatus for the image reader unit according to claim 4, wherein the axis of rotation of said supporting mechanism coincides substantially with the optical axis.

8. A position adjusting apparatus for the image reader unit according to claim 4, wherein the central point of swing of said supporting mechanism coincides with a center of the lens.

9. An image reader unit incorporated in an image reading apparatus, comprising:

a sensor for reading an image;

a supporting mechanism which supports a spherical periphery of a ball member projected from a supporting unit for the sensor with a ball bearing, while allowing the image reader unit to rotate around the ball member as a central point of swing and to swing in a direction vertical to an axis of rotation of the image reader unit.

10. The image reader unit according to claim 9, further comprising:

a height adjusting mechanism which supports the image reader unit in such a way that the image reader unit can rotate around the central point of swing and the axis of rotation, and adjusts the height of the image reader unit; and a tilt adjusting mechanism for adjusting an inclination of the image reader unit by rotation thereof around the axis of rotation.

11. A method of adjusting positions of an image reader unit disposed at a predetermined position in an image reading apparatus and having a lens and a sensor positioned with respect to each other, using a position adjusting apparatus, comprising the steps of:

adjusting the height of the image reader unit by swinging the image reader unit at a side of the sensor around a central point of swing in a direction vertical to an optical axis of the image reader unit, and adjusting an inclination of the image reader unit by rotating the image reader unit around an axis of rotation which is parallel to the optical axis.

* * * * *